US012374349B2

(12) United States Patent
Shi et al.

(10) Patent No.: US 12,374,349 B2
(45) **Date of Patent: *Jul. 29, 2025**

(54) ECHO ESTIMATION AND MANAGEMENT WITH ADAPTATION OF SPARSE PREDICTION FILTER SET

(71) Applicant: Dolby Laboratories Licensing Corporation, San Francisco, CA (US)

(72) Inventors: Dong Shi, Singapore (SG); Kai Li, Beijing (CN); Hannes Muesch, Oakland, CA (US); David Gunawan, Sydney (AU); Paul Holmberg, Marsfield (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 18/082,470

(22) Filed: Dec. 15, 2022

(65) Prior Publication Data

US 2023/0121651 A1 Apr. 20, 2023

Related U.S. Application Data

(63) Continuation of application No. 17/075,659, filed on Oct. 20, 2020, now Pat. No. 11,538,486, which is a (Continued)

(30) Foreign Application Priority Data

Jun. 8, 2016 (WO) ................ PCT/CN2016/085288
Jul. 20, 2016 (EP) .................................... 16180309

(51) Int. Cl.
*H04M 9/08* (2006.01)
*G10L 21/0232* (2013.01)
(Continued)

(52) U.S. Cl.
CPC ...... *G10L 21/0232* (2013.01); *G10L 21/0264* (2013.01); *H04R 3/02* (2013.01); (Continued)

(58) Field of Classification Search
CPC ....................... H04M 9/082; G10L 2021/0282
See application file for complete search history.

(56) References Cited

U.S. PATENT DOCUMENTS 5,577,116 A 11/1996 Townsend
5,745,564 A 4/1998 Meek
(Continued)

FOREIGN PATENT DOCUMENTS

CN 1810015 A 7/2006
CN 105027540 A 11/2015

OTHER PUBLICATIONS

Marques, P.A.C., et al., "A DSP based long distance echo canceller using short length centered adaptive filters", 1997 IEEE International Conference on Acoustics, Speech, and Signal Processing, Year: 1997, vol. 3, pp. 1885-1888.
(Continued)

*Primary Examiner* — Ping Lee

(57) ABSTRACT

Methods for echo estimation or echo management (echo suppression or cancellation) on an input audio signal, with at least one of adaptation of a sparse prediction filter set, modification (for example, truncation) of adapted prediction filter impulse responses, generation of a composite impulse response from adapted prediction filter impulse responses, or use of echo estimation and/or echo management resources in a manner determined at least in part by classification of the input audio signal as being (or not being) echo free. Other aspects are systems configured to perform any embodiment of any of the methods.

13 Claims, 2 Drawing Sheets

Related U.S. Application Data continuation of application No. 16/308,761, filed as application No. PCT/US2017/036342 on Jun. 7, 2017, now Pat. No. 10,811,027.

(60) Provisional application No. 62/361,069, filed on Jul. 12, 2016.

(51) Int. Cl.

| | |
|---|---|
| ***G10L 21/0264*** | (2013.01) |
| ***H04R 3/02*** | (2006.01) |
| ***H04R 3/04*** | (2006.01) |
| *G10L 21/0208* | (2013.01) |
| *H04R 27/00* | (2006.01) |

(52) U.S. Cl.

CPC ...... *H04R 3/04* (2013.01); *G10L 2021/02082* (2013.01); *H04R 27/00* (2013.01)

(56) References Cited

U.S. PATENT DOCUMENTS

| | | | | |
|---|---|---|---|---|
| 6,842,516 | B1 | 1/2005 | Armbruester | |
| 7,062,040 | B2 | 6/2006 | Faller | |
| 7,068,780 | B1 | 6/2006 | Levonas | |
| 7,792,281 | B1 | 9/2010 | Zad-Issa | |
| 8,824,667 | B2 | 9/2014 | Mazurenko | |
| 9,020,144 | B1 | 4/2015 | Yang | |
| 9,049,281 | B2 | 6/2015 | Lu | |
| 2004/0057574 | A1 | 3/2004 | Faller | |
| 2006/0140392 | A1 | 6/2006 | Ahmadi | |
| 2014/0003611 | A1 | 1/2014 | Mohammad | |
| 2015/0081822 | A1 | 3/2015 | Gonen | |
| 2015/0180536 | A1 * | 6/2015 | Zhang | G10L 21/0364 381/66 |
| 2015/0371654 | A1 | 12/2015 | Johnston | |
| 2016/0019909 | A1 | 1/2016 | Shi | |
| 2016/0127527 | A1 | 5/2016 | Mani | |

OTHER PUBLICATIONS

Zhiping, Zhang et al., "Adaptive echo cancellation combined with delay estimation", pub Dec. 31, 2013, Engineering Village, Source: Applied Mechanics and Materials, ISSN: 1660-9336, Publisher: Trans Tech Publications ltd., Switzerland, v 303-306, pp. 2072-2075.

* cited by examiner

ECHO ESTIMATION AND MANAGEMENT WITH ADAPTATION OF SPARSE PREDICTION FILTER SET

CROSS-REFERENCE TO RELATED APPLICATIONS

The present application is a continuation of U.S. patent application Ser. No. 17/075,659, filed Oct. 20, 2020, which is a continuation of U.S. patent application Ser. No. 16/308,761, filed Dec. 10, 2018 (now U.S. Pat. No. 10,811,027 granted Oct. 20, 2020), which is the United States National Stage of International Patent Application No. PCT/US2017/036342, filed Jun. 7, 2017, which claims priority to International Patent Application No. PCT/CN2016/085288 filed Jun. 8, 2016; U.S. Provisional Patent Application No. 62/361,069, filed Jul. 12, 2016, and European Patent Application No. 16180309.3, filed Jul. 20, 2016, all of which are incorporated herein by reference in their entirety.

TECHNICAL FIELD

The invention pertains to systems and methods for estimating and managing (suppressing or cancelling) echo content of an audio signal (e.g., echo content of an audio signal received at a node of a teleconferencing system).

BACKGROUND

Herein, "echo management" is used to denote either echo suppression or echo cancellation on an input audio signal, or both of echo suppression and echo cancellation on an input audio signal. Herein, "echo estimation" is used to denote generation of an estimate of echo content of an input audio signal (e.g., a frame of an input audio signal), for use in performing echo management on the input audio signal. Performance of echo management typically includes a step of echo estimation. In references in the present disclosure to a method including a step of echo estimation (to generate an estimate), and a step of echo management (using the estimate), it should be understood that the echo management step need not include an additional echo estimation step (in addition to the expressly recited echo estimation step).

It is well known to use an echo suppression or cancellation system (sometimes referred to herein as an "Echo Suppressor" or "ES") to suppress or cancel echo content (e.g., echo received at a node of a teleconferencing system) from audio signals. Often, a conventional ES is implemented at (or as) a "first" endpoint (at which a user of the ES is located) of a teleconferencing system, and the ES has two ports: an input to receive the audio signal from the far end (a second endpoint of the teleconferencing system, at which a party is located who converses with the user of the ES); and an output for sending the user's own voice to the far end. The far end may return the user's own voice back to the input of the ES, so that the returned own voice may be perceived (unless it is suppressed or cancelled) as echo by the ES user. In the context of such an ES, the user's own voice sent through the output is referred to as the "reference," and a "reference audio signal" sent to the far end is indicative of the reference.

The audio signal received (referred to herein as "input" audio, "input" signal, or "input" audio signal) at the input of such an ES is indicative of voice and/or noise from the far end (far end speech) and echo of the ES user's own voice. The user's own voice content (sent from the output of the ES) is returned to the input of the ES as "echo" after some transmission delay, T (or "r") and after undergoing attenuation (referred to herein as "Echo Loss" or "EL").

The input audio received by the ES is segmented into audio frames, where "frame" refers to a segment of the input signal having a specific duration (e.g., 20 ms) that can be represented in the frequency domain (e.g., via an MDCT of the time domain input signal).

The goal of an ES is to suppress the echo component of the input signal. Suppression denotes applying attenuation to each frame of the input signal such that after suppression the input frame resembles as closely as possible the input frame that would have been observed had there not been any echo (i.e., the far end speech alone). When the input frame is represented in the frequency domain, this means determining an attenuation function (a set of gains, one for each frequency bin) and applying the attenuation function to the input frame.

To calculate the attenuation function one needs an estimate of the echo component in the input frame. The echo component is known to be a delayed (by a transmission delay) and attenuated (by the EL) version of the reference, but the delay and EL are unknown. Therefore, to estimate the echo component in the current input frame, the ES must: estimate the transmission delay, estimate the EL, retrieve a stored copy of the corresponding segment (frame) of the reference that was output "n" frames ago (where "n"= (transmission delay/frame duration)), and attenuate that reference frame by EL.

Transmission delay and EL can be estimated by adapting one or several prediction filters. The prediction filter(s) take as input the reference signal, and output a set of values that is as close as possible to (e.g., has minimal distance from) the corresponding values observed in the input signal.

The prediction is done using either: a single filter that operates on time domain samples of a frame of the reference signal; or a set of M filters, each corresponding to one bin (e.g., frequency bin) of an M-bin, frequency domain representation of a frame of the reference signal. Typically, a bin is one sample of a frequency domain representation of a signal.

When the prediction is done on the frequency domain bins with a set of M filters (one filter for each bin), the length of each of these filters is only 1/M of the length of the single time domain filter needed to capture the same range of delay.

The coefficients of the prediction filter(s) are adjusted by an adaptation mechanism to minimize the distance between the output of the prediction filter(s) and the input. Adaptation mechanisms are well known in the art (e.g., LMS, NLMS, and PNLMS adaptation mechanisms are conventional).

In a typical ES, the echo loss (EL) is taken as the sum of the square of the adapted prediction filter coefficients, and the transmission delay is taken as the delay of the filter tab (tap) at which the adapted prediction filter impulse response has the highest amplitude.

BRIEF DESCRIPTION OF THE INVENTION

In a class of embodiments, the invention provides improvement in the robustness and computational efficiency of echo management (e.g., echo suppression by operation of an Echo Suppressor or "ES") on an input signal and/or echo estimation on an input signal. Typical embodiments of the inventive method and system perform or implement (or are configured to perform or implement) at least one (and preferably all three) of the following features: adaptation of a sparse spectral prediction filter representation (e.g., adaptation of N prediction filters, consisting of one filter for each bin (e.g., frequency bin) of an N-bin subset of a full set of M bins of a frequency domain representation of the input audio signal) to increase efficiency of echo estimation (and/or echo management) on the input audio signal; exploitation of prior knowledge regarding the transmission channel or echo path (e.g., knowledge regarding the likelihood of experiencing line echo and/or acoustic echo) to achieve improved robustness of echo estimation (and/or echo management); and subsampling of the update rate of echo estimation to achieve improved efficiency of echo suppression. Typical embodiments are applicable to estimation (and suppression or cancellation) of acoustic echo as well as line echo. While typical embodiments are described in the context of echo suppressors, these and other embodiments are also applicable to echo cancellers.

In one class of embodiments, the invention is a method for performing echo estimation or echo management on an input audio signal, said method including steps of:

(a) determining an M-bin, frequency domain representation of the input audio signal, and a sparse prediction filter set consisting of N prediction filters, where each of the N prediction filters corresponds to (e.g., in the sense of being used to process audio data values in) a different (e.g., respective) bin of an N-bin subset of the M-bin frequency domain representation, where N and M are positive integers and N is less than M (preferably, N is much less than M. Each of the N prediction filters may only process audio data values in its respective bin. For example, M=160 and N=6, or M=160 and N=4, in some contemplated implementations); and (b) performing echo estimation on the input audio signal, including by adapting the N prediction filters to generate a set of N adapted prediction filter impulse responses, and generating an estimate of echo content of the input audio signal including by processing the N adapted prediction filter impulse responses.

In embodiments, performing echo estimation involves, for each of the N bins:

estimating a transmission delay of the echo content for the respective bin based on the respective adapted filter impulse response (e.g., by referring to a position of a peak of the respective adapted filter impulse response); and/or estimating an attenuation (echo loss) of the echo content for the respective bin based on the respective adapted filter impulse response (e.g., by referring to an amplitude of a peak of the respective adapted filter impulse response).

For example, the echo content of the input signal is indicated by a reference signal (e.g., the echo content is a delayed and attenuated version of the reference signal). Then, the transmission delay may be the delay between the (echo content of) the input signal and the (buffered) reference signal. Further, the attenuation (echo loss) may be the attenuation between the echo content of the input signal and the (e.g., buffered) reference signal. That is, performing echo estimation may involve estimating a transmission delay of the echo content compared to the reference signal for each of the N bins. Further, performing echo estimation may involve estimating an attenuation (echo loss) of the echo content compared to the reference signal for each of the N bins.

In embodiments, performing echo estimation involves, for each of the remaining M-N bins:

estimating a transmission delay of the echo content for the respective bin based on the estimated transmission delays of the echo content for the N bins (e.g., by interpolation, extrapolation, or model fitting); and/or estimating an attenuation of the echo content for the respective bin based on the estimated attenuations of the echo content for the N bins (e.g., by interpolation, extrapolation, or model fitting).

Also here, the transmission delay may be a transmission delay of the echo content compared to the reference signal for the respective bin. Likewise, the attenuation may be an attenuation compared to the reference signal for the respective bin.

In embodiments, the method also includes a step of:

(c) performing echo management on the input audio signal using the estimate of echo content, thereby generating an echo-managed (e.g., echo-suppressed) audio signal. Optionally, the method also includes one or both of the steps of rendering the echo-managed audio signal to generate at least one speaker feed; and driving at least one speaker with the at least one speaker feed to generate a soundfield.

In another class of embodiments, the invention is a method for performing echo estimation or echo management on an input audio signal, said method including steps of:

(a) determining a prediction filter set consisting of N prediction filters, where each of the N prediction filters corresponds to (e.g., in the sense of being used to process audio data values in) a different (e.g., respective) bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of generating a composite impulse response from the adapted prediction filter impulse responses (e.g., from a statistical function of the adapted prediction filter impulse responses, e.g., by applying the statistical function to the adapted prediction filter impulse responses, e.g., by adding or averaging the adapted prediction filter impulse responses), and generating an estimate of transmission delay for echo content of the input audio signal (e.g., a transmission delay estimate for at least one frame of the input audio signal) from the composite impulse response. Optionally, step (b) includes a step of weighting the composite impulse response with a transformed gradient (e.g., a transformed gradient which has been generated in a manner described in this disclosure) to generate a weighted composite impulse response, and generating the estimate of transmission delay from the weighted composite impulse response.

For example, step (b) includes steps of:

determining a gradient of a prediction error of a given prediction filter along the direction of filter taps;

determining, for each filter tap, a respective weight based on the gradient of the prediction error for the respective filter tap;

weighting the composite impulse response by weighting each filter tap of the composite impulse response by its respective weight to obtain a weighted composite impulse response; and generating the estimate of transmission delay from the weighted composite impulse response.

Therein, for each filter tap of the given prediction filter (e.g., prototype filter, e.g., of the same length as the N prediction filters), the prediction error may be the prediction error of a truncated prediction filter that is derived from the given prediction filter by truncation after the respective filter tap. The weights may be positively correlated with the decrease of prediction error as filter tap length increases (e.g., large weights for filter taps for which the prediction error strongly decreases as tap filter length increases, and small weights otherwise).

In embodiments, the method also includes a step of:

(c) performing echo management on the input audio signal using the estimate of echo content thereby generating an echo-managed audio signal.

In embodiments, the method also includes steps of:

rendering the echo-managed audio signal to generate at least one speaker feed; and/or driving at least one speaker with the at least one speaker feed to generate a soundfield.

In another class of embodiments, the invention is a method for performing echo estimation or echo management on an input audio signal, said method including steps of:

(a) determining a prediction filter set consisting of N prediction filters, where each of the N prediction filters corresponds to (e.g., in the sense of being used to process audio data values in) a different bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of modifying the adapted prediction filter impulse responses (e.g., by removing therefrom each peak having absolute value greater than a threshold value, and/or removing from each of the adapted prediction filter impulse responses each peak suggesting transmission delay different from a consensus delay estimate, where the consensus delay estimate is determined from the other adapted prediction filter impulse responses), thereby generating modified prediction filter impulse responses, and generating an estimate of transmission delay and/or an estimate of echo loss of the input audio signal (e.g., a transmission delay estimate for at least one frame of the input audio signal) from the modified prediction filter impulse responses.

In another class of embodiments, the invention is a method for performing echo estimation or echo management on an input audio signal, where the input audio signal has an expected maximum transmission delay, said method including steps of:

(a) determining a prediction filter set consisting of N prediction filters, where each of the N prediction filters corresponds to (e.g., in the sense of being used to process audio data values in) a different bin of a frequency domain representation of the input audio signal, N is a positive integer, and each of the N prediction filters has length greater than L, where L is the expected maximum transmission delay; and (b) performing echo estimation on the input audio signal, including by adapting the N prediction filters to generate a set of N adapted prediction filter impulse responses, truncating each of the adapted prediction filter impulse responses to generate a set of N truncated adapted prediction filter impulse responses, each of the truncated adapted prediction filter impulse responses having length not greater than L, and generating an estimate of echo content of the input audio signal including by processing the N truncated adapted prediction filter impulse responses.

In another class of embodiments, the invention is a method for performing echo estimation or echo management on an input audio signal, said method including steps of:

(a) classifying the input audio signal as being echo free, in the sense of requiring relatively few echo estimation and/or echo management resources, or as not being echo free and thus needing relatively more echo estimation and/or echo management resources; and (b) performing the echo estimation or echo management on the input audio signal, in a manner using echo estimation and/or echo management resources determined at least in part by classification of the input audio signal as being echo free or as not being echo free.

In embodiments, step (b) includes a step of performing echo management on the input audio signal, thereby generating an echo-managed (e.g., echo-suppressed) audio signal. Optionally, the method also includes one or both of the steps of rendering the echo-managed audio signal to generate at least one speaker feed; and driving at least one speaker with the at least one speaker feed to generate a soundfield.

Aspects of the invention include a system configured (e.g., programmed) to perform any embodiment of the inventive method or steps thereof, and a computer readable medium (for example, a disc or other tangible storage medium) which stores code for performing (e.g., coder executable to perform) any embodiment of the inventive method or steps thereof. For example, the inventive system can be or include a programmable general purpose processor, digital signal processor, or microprocessor (e.g., included in, or comprising, a teleconferencing system endpoint or server), programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

NOTATION AND NOMENCLATURE

Figure 1:
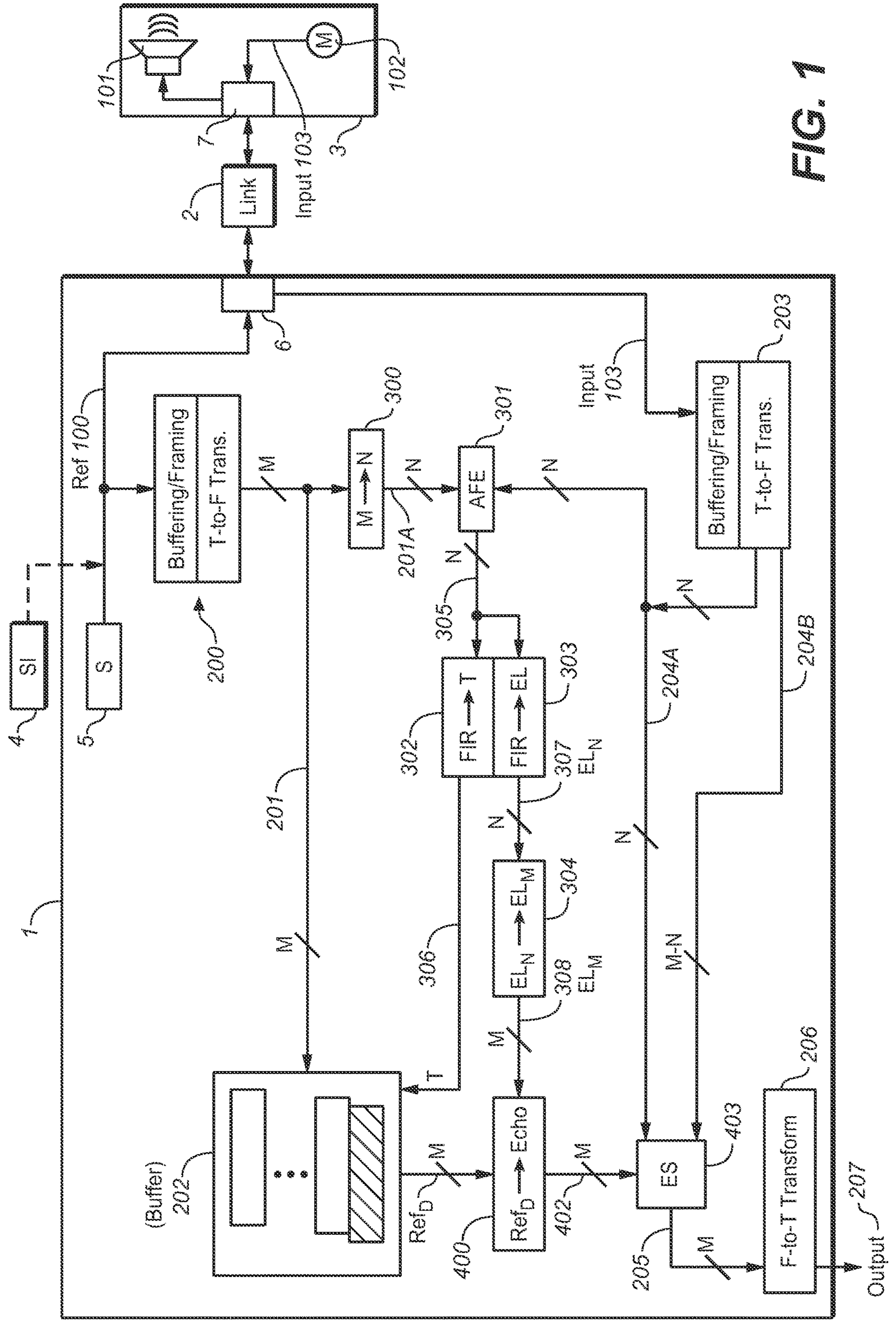
FIG. 1 is a block diagram of a teleconferencing system including an embodiment of the inventive system.

Throughout this disclosure, including in the claims, the term “node” of a teleconferencing system denotes an endpoint (e.g., a telephone) or server of the teleconferencing system.

Throughout this disclosure, including in the claims, the terms “speech” and “voice” are used interchangeably in a broad sense to denote audio content perceived as a form of communication by a human being, or a signal (or data) indicative of such audio content. Thus, “speech” determined or indicated by an audio signal may be audio content of the signal which is perceived as a human utterance upon reproduction of the signal by a loudspeaker.

Throughout this disclosure, including in the claims, the term “noise” is used in a broad sense to denote audio content other than speech, or a signal (or data) indicative of such audio content (but not indicative of a significant level of speech). Thus, "noise" determined or indicated by an audio signal captured during a teleconference (or by data indicative of samples of such a signal) may be audio content of the signal which is not perceived as a human utterance upon reproduction of the signal by a loudspeaker (or other sound-emitting transducer).

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed (the speaker feed may undergo different processing in different circuitry branches coupled to the different transducers).

Throughout this disclosure, including in the claims, the expression "to render" an audio signal denotes generation of a speaker feed for driving a loudspeaker to emit sound (indicative of content of the audio signal) perceivable by a listener, or generation of such a speaker feed and assertion of the speaker feed to a loudspeaker (or to a playback system including the loudspeaker) to cause the loudspeaker to emit sound indicative of content of the audio signal.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system and method will be described with reference to FIGS. 1 and 2.

FIG. 1 is a block diagram of a teleconferencing system, including a simplified block diagram of an embodiment of the inventive system showing logical components of the signal path.

In FIG. 1, system 1 is coupled by link 2 to system 1. System 1 is an echo suppressor (ES) configured to perform echo suppression by operation of echo suppression subsystem 403 and elements 6, 200, 202, 203, 206, 300, 301, 303, 304, and 400 thereof, coupled as shown in FIG. 1. System 3 is a conferencing system endpoint which includes elements 6, 200, 202, 203, 206, 300, 301, 303, 304, 400, and 403, configured to implement echo suppression, and optionally also audio signal source 5, coupled as shown.

The subsystem of system 1 comprising elements 6, 200, 202, 203, 206, 300, 301, 303, 304, and 400 implements an echo estimator, whose output (402) is an estimate of the echo content of the current frame of the input signal 103. This echo estimator is an exemplary embodiment of the inventive echo estimation system. Echo suppression subsystem 403 of system 1 is coupled and configured to suppress the echo content of each current frame of input signal 103 (e.g., by subtracting each frequency bin of the echo estimate 402 (for the current frame of input signal 103) from the corresponding bin of a frequency-domain representation (204A and 204B) of the current frame of input signal 103).

In some embodiments, system 1 is a conferencing system endpoint which includes elements 6, 200, 202, 203, 206, 300, 301, 303, 304, 400, and 403, configured to implement echo suppression, and audio signal source 5 (which may be a microphone or microphone array configured to capture audio content during a teleconference), coupled as shown, and optionally also additional elements (e.g., a loudspeaker for use during a teleconference). In some embodiments, system 1 is a server of a conferencing system which includes the elements shown in FIG. 1 (except that audio signal source 5 is optionally omitted) and elements (other than those expressly shown in FIG. 1) configured to perform teleconference server operations.

When present, audio signal source 5 of system 1 is coupled and configured to generate, and output to element 200 and interface 6 (of system 1) an audio signal 100 (referred to herein as "reference signal" 100). For example, reference signal 100 is indicative of audio content (which may include speech content of at least one conference participant) captured during a teleconference.

In some other embodiments, reference signal 100 originates at a system (identified by reference numeral 4 in FIG. 1) which is distinct from but coupled to system 1, rather than at a source (e.g., source 5) within system 1. For example, when system 1 is implemented as a server of a conferencing system, the external source (system 4) of reference signal 100 may be a conference system endpoint. In such embodiments, source 5 may be omitted from system 1, and the external source (system 4) is coupled and configured to provide reference signal 100 to element 200 and interface 6 of system 1.

Interface 6 implements both an input port (at which an input audio signal 103 is received by system 1 and provided to subsystem 203 of system 1) and an output port (from which reference signal 100 is output from system 1).

In operation of systems 1 and 3, reference signal 100 is sent, via interface 6 of system 1, to link 2, and from link 2 to interface 7 of system 3, and is then rendered (e.g., by elements of system 3 not expressly shown) for playback by speaker 101 of system 3 (e.g., during a teleconference).

System 3 is configured to generate input signal 103, which is indicative of sound captured by microphone 102 of system 3 (e.g., during a teleconference), and to send input signal 103, via interface 7 of system 3 and link 2, to interface 6 of system 1. For example, input signal 103 is indicative of both: speech ("far end speech") uttered at the location of system 3 by a conference participant (e.g., in response to sound emitted from speaker 101 which is perceived as speech indicated by reference signal 100); and echo (e.g., an echo of audio content indicated by reference signal 100, which has undergone playback by speaker 101 and then capture by microphone 102).

Also in system 1, reference signal 100 is buffered in subsystem 200 to accumulate (provide) frames of time domain samples (e.g., a sequence of frames of time domain samples are accumulated in subsystem 200, each frame corresponding to a different segment of signal 100), and the samples of each such frame are transformed (by subsystem 200) into the frequency domain, thereby generating data values 201. The values 201 corresponding to each frame of time domain samples are an M-bin representation of the frame. Each of the M bins corresponds to a different frequency range.

Buffer 202 and selection subsystem 300 of system 1 are coupled to subsystem 200. The values 201 generated from each frame of time domain samples (of reference signal 100) are accumulated in buffer 202. In subsystem 300, N of the M bins of the values 201 (generated from each frame of time domain samples of reference signal 100) are selected, where N is an integer less than (and typically much less than) the integer M, thereby selecting an N-bin subset 201A of the M values 201 generated from each frame. In subsequent processing in subsystems 301, 303, and 304 of system 1, the processing is performed on values in the selected N bins only, to implement a sparse (N-bin, rather than M-bin) spectral representation of the prediction filters which undergo adaptation in subsystem 301 (as described below), and increase the efficiency of the echo suppression.

In order to achieve such a sparse spectral representation of the prediction filters, subsystem 300 selects a subset of N of the M bins of the frequency domain representation of reference signal 100 (and of input signal 103). Typically, N is much less than M (i.e., N<<M). As a result of this selection, subsystem 301 adapts only a relatively small set of N prediction filters (rather than a larger set of M prediction filters), and subsystem 303 is implemented more efficiently to obtain only N (rather than M) predictions of echo loss ($EL_N$) at N frequencies. Subsystem 304 is implemented to estimate the EL for each of the remaining (M−N) frequency bins from the predicted echo loss values $EL_N$.

In one contemplated implementation, M=160 and N=6. In another contemplated implementation, M=160 and N=4. In both these contemplated implementations and in other typical implementations, N is much less than M (i.e., N<<M).

The choice of which N-bin subset of the full set of M bins (including the choice of the value "N") is selected by subsystem 300 is preferably made in a manner which improves robustness of the echo estimation and/or echo suppression (e.g., by exploiting prior knowledge about the transmission channel or echo path). For example, in some preferred embodiments, the N bins of the subset are selected so that they are at frequencies where the input signal (to undergo echo estimation and optionally also echo management) has significant speech energy so as to obtain a favorable echo to background ratio, and/or so that they are at frequencies which minimize the correlation between the impulse responses of the prediction filters, and/or so that they are at frequencies which avoid harmonic relation among the selected N bins.

Values 201A are fed from subsystem 300 to Adaptive Filter Estimation ("AFE") subsystem 301.

Meanwhile, input signal 103 is provided from interface 6 to subsystem 203, and is buffered in subsystem 203 to accumulate (provide) frames of time domain samples (e.g., a sequence of frames of time domain samples are accumulated in subsystem 203, each frame corresponding to a different segment of signal 103), and the samples of each such frame are transformed (by subsystem 203) into the frequency domain, thereby generating data values 204A and 204B. The "N" values 204A (where "N" is the same number as the number, N, of bins of the output of subsystem 300), and the "M-N" values 204B corresponding to each frame of time domain samples, are together an M-bin representation of the frame. Each of the M bins corresponds to a different frequency range.

Values 204A are in the same N bins selected by subsystem 300, and the values 204A are fed from subsystem 203 to AFE subsystem 301.

AFE subsystem 301 adaptively determines N prediction filters (one for each of the N bins selected by subsystem 300, for each frame of input signal 103) for use by subsystems 302 and 303 to estimate transmission delay (τ) for the echo content of each frame of input signal 103, and preferably also to estimate EL (echo loss) in each of the N bins (selected by subsystem 300) for each frame of input signal 103. Estimation of transmission delay and/or echo content for each frame and each bin may be based on the respective adapted prediction filter impulse response (e.g., impulse responses of the adapted prediction filters).

In some alternative embodiments, echo estimation may be implemented more simply (although possibly with somewhat lower quality) by deriving a single broadband EL estimate from the N adapted prediction filter impulse responses output (one for each of the N bins) from subsystem 301. For example, subsystem 303 may be implemented to determine a single EL (for a frame of input signal 103) from a composite impulse response generated (e.g., in subsystem 303) from the N adapted prediction filter impulse responses for the frame (e.g., from a composite impulse response which is a statistical function, such as the sum or average, for example, of the N adapted prediction filter impulse responses for the frame). If only a single broadband EL estimate is generated (e.g., by subsystem 303) for each frame, the operation performed by subsystem 304 (generation of M echo loss estimates, $EL_M$, for the full set of M bins) then becomes trivial (e.g., subsystem 304 simply assigns the same EL estimate (the single EL estimate from subsystem 303) to all M bins, to "generate" the $EL_M$ values for the frame). Embodiments in which only a single broadband EL estimate is generated for a frame (from the plurality of adapted prediction filter impulse responses for the frame) do not separately estimate echo loss in each of the N bins corresponding to N adapted prediction filter impulse responses.

In response to each set of values 201A for the N bins of a frame of the reference signal 100, and the corresponding set of values 204A for the N bins of the corresponding frame of the input signal 103, AFE subsystem 301 produces a set of N prediction filter impulse responses 305. For each frame of the reference signal 100, subsystems 301, 302, and 303 operate together to determine (and to output to buffer 202 from subsystem 302) an estimated transmission delay (τ) value which, when applied to the relevant frequency components (201A) of the frame of the reference signal 100, produces a delayed version which is as "close" as possible (e.g., minimal distance) to the frequency components (204A) of the input signal 103 in the corresponding frame. For each of the N selected bins of frequency components (201A) of each frame of reference signal 100, subsystems 301, 302, and 303 operate together to determine (and to output to subsystem 304 from subsystem 303) an estimated EL (echo loss) value which, when applied to the relevant frequency components 201A (for the relevant bin and frame) of reference signal 100, produces an attenuated version which is as close as possible to (e.g., in the sense of having minimal distance from) the corresponding frequency components of input signal 103. Subsystem 301 implements adaptation of N prediction filters, in which the adaptation of each filter causes the adapted filter to take as input the content (in the relevant bin) of the relevant frame of reference signal 100 and output a value that is as close as possible to (e.g., in the sense of having minimal distance from) the value observed in the corresponding bin of the corresponding frame of input signal 103. In a typical embodiment, subsystem 301 implements a PNLMS (proportionate normalized LMS) adaptation mechanism to adjust prediction filter coefficients to generate the adapted prediction filter impulse responses 305. Alternatively, subsystem 301 implements another adaptation mechanism to adjust prediction filter coefficients to generate adapted prediction filter impulse responses 305.

Subsystem 302 is coupled and configured to process each sparse set of N prediction filter impulse responses 305 for each frame of input signal 103 to produce a single transmission delay estimate 306 (sometimes referred to as delay τ), indicative of the delay of the echo content of the relevant frame of signal 103 relative to original content of the corresponding frame of reference signal 100. Subsystem 303 is coupled and configured to process the same N prediction filter impulse responses 305, preferably to produce N Echo Loss ("$EL_N$") estimates 307 (where each of the $EL_N$ estimates is for a different one of the sparse set of N frequency bins selected by subsystem 300). As noted above, in some alternative embodiments, subsystem 303 is configured to produce a single EL (for a frame of input signal 103) from a composite impulse response generated (e.g., in subsystem 303) from the N adapted prediction filter impulse responses for the frame (e.g., from a composite impulse response which is the sum or average of the N adapted prediction filter impulse responses for the frame).

Delay estimate 306 is used to control access into buffer 202 to retrieve an appropriately delayed frame ("$Ref_D$") of the reference signal 100. The retrieved reference frame ("$Ref_D$") corresponds to the current frame of input signal 103, so that content of the retrieved reference frame ("$Ref_D$") which corresponds to echo content of the current frame of input signal 103 can be estimated and then used to suppress the echo content.

The retrieved reference frame ("$Ref_D$") is attenuated in 400 by the EL estimate 308 (e.g., the $EL_M$ values which are output from subsystem 304) to produce an estimate 402 of the current echo (e.g., an estimate of the echo content of the current frame of input signal 103).

The echo estimate 402 (for the current frame of input signal 103) is used in echo suppression subsystem 403 to suppress the echo in the M-bin frequency domain representation (204A and 204B) of the current frame of input signal 103. More specifically, echo suppression subsystem 403 is coupled and configured to suppress the echo content of each current frame of input signal 103, for example by subtracting the value in each frequency bin of the echo estimate 402 (for the current frame of input signal 103) from the value in the corresponding bin of a frequency-domain representation (204A and 204B) of the current frame of input signal 103.

In operation, for each current frame of input signal 103, subsystem 403 generates an output 205, which is an M-bin frequency domain representation of an echo-suppressed version of the current frame of input signal 103. The output 205, for each current frame of input signal 103, is transformed back into the time domain by frequency-to-time domain transform subsystem 206 to produce the final output signal 207. Output signal 207 is a time-domain, echo-suppressed version of input signal 103.

In practical echo suppression systems, transmission delay is constant across frequency (there is no dispersion), or where dispersion does exist, it is negligible relative to the frame rate (e.g., the sampling rate of the prediction filter(s)). Therefore, each of the N adapted prediction filter impulse responses 305 of system 1 may be expected to have its highest peak at the same tab (where "tab," also referred to as "tap," denotes the time, relative to an initial time, which corresponds to a value of an impulse response, or at which the value of the impulse response occurs), and such tab corresponds (and indicates) the transmission delay (of the echo content of the input signal). This expectation also applies when N=M (i.e., when there is no subsampling). However, due to maladaptation, the peak in each of the N adapted prediction filter impulse responses 305 at the true transmission delay may be smaller than other peaks in the impulse response, so that an incorrect delay estimate would result if the tab with the highest amplitude were picked.

Thus, to improve the robustness of the transmission delay estimate 306, subsystem 302 is preferably configured with recognition that the values of each impulse response 305 at tabs (taps) other than the true transmission delay are uncorrelated or only weakly correlated between the frequency bins/prediction filters, thus having a tendency to cancel each other when the impulse responses of several bins/filters are being added or averaged, whereas the peaks at the true transmission delay will add constructively. Thus, subsystem 302 is preferably configured to add or average the N adapted prediction filter impulse responses 305 to determine a composite impulse response, which will tend to emphasize the peak at the true delay, and to take the tab (tap) of the peak of this composite impulse response as the transmission delay estimate 306.

The inventors have also recognized that a prediction filter impulse response of length L has a prediction error associated with it. The filter coefficients at or near the tab (tap) corresponding to the transmission delay contribute more to reducing the prediction error than do coefficients at other tabs. As one shortens the prediction filter by successively removing the last tab, the prediction error will tend to increase with each removed tab. The rate of increase will be highest when the tabs that account for most of the prediction accuracy, namely the tabs at or near the true transmission delay, are removed. That is, the prediction error will increase dramatically when the prediction filter is shortened to the point where it is no longer long enough to cover the transmission delay. In view of this, the inventors have recognized that subsystem 302 is desirably implemented to modify the above-mentioned composite impulse response (determined from the N adapted prediction filter impulse responses 305), and to determine the delay estimate 306 from the modified composite impulse response, so as to improve the robustness of the delay estimate 306. Specifically, one such desirable implementation of subsystem 302 is configured to modify the composite impulse response as follows, and to determine the delay estimate 306 from the modified composite impulse response as follows:

(a) calculate (e.g., for each frame) the prediction error for each of L prediction filters, where the filters are derived from a prototype filter of length L by successively removing the last filter tab, (b) derive a vector of L smoothed prediction errors (e.g., smooth each of the L predictions errors over time to derive a vector of L smoothed prediction errors), (c) obtain the gradient along the tab dimension of the vector of L (e.g., smoothed) prediction errors, (d) determine a set of (e.g., L) weights based on the vector of L (e.g., smoothed) prediction errors (e.g., transform that gradient such that large values are obtained when the gradient is strongly negative (prediction error decreases as tab length increases) and small values otherwise), (e) weight the composite impulse response (e.g., generated by subsystem 302 from the adapted prediction filter impulse responses 305) with the transformed gradient, thereby generating the modified (e.g., weighted) composite impulse response, and (f) select the tab (of the modified composite impulse response) with the highest value as the prediction (306) of the transmission delay for the frame.

Calculation of the output of the shortened filters (of the set of L prediction filters employed in step (a)) does not require any additional computation. As the output of the prototype filter of length L is calculated in a direct-form representation, intermediate results corresponding to the output of the filters of length L−(L−1), . . . , L−2, L−1 are obtained and simply need to be set aside.

Subsystems 302 and 303 are also preferably configured to use a priori assumptions about the echo path to further increase the robustness of the delay estimate 306 and of the EL estimates 307.

For example, subsystems 302 and 303 may be configured to remove peaks (in impulse responses 305) whose absolute value is larger than a threshold value, and then using the modified impulse responses to generate estimates 306 and 307. This is based on recognition that EL has an expected range, e.g., EL is expected to be higher than 6 dB (i.e., any returning echo is attenuated at least 6 dB). Larger peaks (suggesting a lower EL) are likely the result of the prediction filter having maladapted. Such larger peaks therefore do not carry information about the transmission delay and, because of their size, mask the smaller peak at the true delay. Removing the larger peak(s) (whose absolute value(s) exceed the threshold) increases the likelihood of picking the tab (to determine the estimate 306) at the correct delay providing the highest peak. Removing the larger peak(s) also improves the accuracy of the EL estimates 307 for each bin. Subsystems 302 and 303 can beneficially be configured to implement this aspect of the invention (the aspect described in this paragraph) regardless of the number ("N") of prediction filters (i.e., for any value of N in the range from N=1 to N=M).

For another example, subsystem 302 may be configured to remove peaks (in impulse responses 305) that suggest a delay substantially different from a consensus delay estimate, and to then use the modified impulse responses to generate estimate 306. This is based on the assumption that the true delay is the same for each bin (band). One such implementation of subsystem 302 is follows: for each filter 305 (each bin), the tab of the highest peak is taken as a delay candidate; then, the average distance to all other (N−1) candidates is determined. On the assumption that most bins (bands) produce a delay candidate at or near the true delay, candidates at or near the true delay will have lower average distance than "outlier" candidates. Thus, in the example implementation, subsystem 302 is configured to remove an outlier peak from one of impulse responses 305, replace it with the next highest peak in the relevant bin (band), and repeat until all outlier peaks have been removed and replaced (for each bin).

The inventors have recognized that the impulse response of a maladapted prediction filter (e.g., a maladapted one of the impulse responses 305) tends to have large values in the tail end of the response. This is akin to the error accumulating at the end of the response. This has been observed consistently. Thus, preferred implementations of system 1 improve the robustness of both the delay estimate 306 and the EL estimate 307 by using (e.g., in subsystem 301) prediction filters of length greater than L (e.g., prediction filters of length K, where K>L), where L is the longest delay expected to occur in the system (i.e., where the input audio signal has an expected maximum transmission delay, and L is this expected maximum transmission delay). Upon adaptation, each of the adaptively determined prediction filter impulse responses is truncated to the length L (e.g., all tabs larger than L are ignored) or to a length not greater than L, thereby generating the adapted prediction filter impulse responses 305 to be truncated impulse responses of length L (or a length not greater than L). It should be appreciated that "truncation" is used herein in a broad sense, e.g., to include an operation of setting tabs at the end of an impulse response to zero, and an operation of ignoring tabs at the end of an impulse response.

Subsystem 304 is configured to expand each set of N "ELN" estimates output from subsystem 303, to generate a set of M Echo Loss ("ELM") estimates 308. Generation of the ELM values (and their subsequent use in subsystem 400) results in improved efficiency by allowing the system to be implemented to calculate only N filter responses instead of a full set of M filter responses. The ELM values for each frame of input signal 103 may include the N "ELN" predictions (e.g., generated in subsystem 303) for the selected subset of N frequency bins of the frame, and EL estimates (e.g., generated in subsystem 304) for the non-selected (M-N) frequency bins. Alternatively, the "M" ELM values for each frame of input signal 103 do not include, although they are generated in response to, the N "ELN" predictions for the selected subset of N frequency bins of the frame (for example, subsystem 304 may replace at least one of the values ELN by a different value for the same bin, e.g., when subsystem 304 implements a fit using a model). In some embodiments, subsystem 304 is configured to generate the EL estimates for the non-selected (M−N) frequency bins from the N "ELN" predictions by interpolation and/or extrapolation (e.g., linear, spline; linear, log(f) or BARK/ERB/MEL frequency axis) of the "ELN" predictions. In other embodiments, subsystem 304 is configured to generate the EL estimates for the non-selected (M−N) frequency bins by fitting a model (e.g., selecting one of several typical EL(f) patterns), or in another manner.

The vast majority of connections (e.g., during teleconferencing) do not contain any significant echo, e.g., echo that is neither bothersome to the user nor detectable by the ES. Moreover, a line with a troublesome echo path tends to exhibit that echo path for the duration of the call and, conversely, a line with no significant echo path tends to stay echo free for the duration of the call. Therefore it is possible to reduce the average computational burden by classifying a line as echo free or as echo full and reducing the computational resources dedicated to echo estimation and/or echo suppression on echo free lines.

Thus, in some embodiments of the invention a line (e.g., an input signal 103) is classified as being "echo free" and thus needing relatively few echo estimation and/or echo suppression resources, or as not being "echo free" and thus needing relatively more echo estimation and/or echo suppression resources, including by performing at least one of the following steps:

(i) observing and accumulating (e.g., averaging, max hold, or perceptually weighting) an echo level estimate for the line and obtaining a measure of the potential for having triggered echo by analyzing the reference signal (e.g., reference level, duration of reference signal with substantial level, or reference spectrum level weighted by "typical" echo path response);

(ii) using prior knowledge about the line (e.g., a log of connection quality for that line or a corresponding known endpoint, or line terminating geography) to either classify the line (or to bias a measure generated in step (ii)); or (iii) using knowledge about the number of users affected by echo in the line (e.g., size of the conference).

In some embodiments of the invention a pattern of reclassifying a previously classified line (e.g., a previously classified input signal 103) as being "echo free" and thus needing relatively few echo estimation and/or echo suppression resources, or as not being "echo free" and thus needing relatively more echo estimation and/or echo suppression resources, is established based on the result of the previous classification. For example, a line is reclassified at fixed time intervals, where length of such a time interval is predefined and fixed (e.g., every x seconds, after y seconds of reference signal, never, or continuously on), or the reclassification is controlled by the decision variable of the previous classification (e.g., when one was more sure that there was no echo, reclassification is performed less frequently).

In some embodiments of the invention, reclassification of a line is triggered as a result of having obtained a measure (e.g., a light-weight measure) of the reference that indicates conditions are good for a reliable echo path estimation (e.g., run echo prediction when the reference has high level and high speech likelihood).

In some embodiments of the invention, the echo estimation and/or echo suppression operation is adjusted (e.g., use of echo estimation and/or echo suppression resources is determined) based on the classification ("echo free" or "echo full"). For example, in response to an "echo free" classification, updating of echo suppression may be turned off completely until the next line classification, or adaptation of prediction filters (e.g., in subsystem 301 of system 1) may be slowed by temporal subsampling (e.g., determination of adapted prediction filters occurs only every n-th frame), or only a subset of the N adapted prediction filters may be updated. In other examples, more prediction filters are adapted in response to an "echo full" classification than in response to an "echo free" classification (e.g., "N_high" filters are adapted in the first case, and "N_low" filters are adapted in the second case, where N_high>N_low), and/or a set of adapted prediction filters is updated less often in response to an "echo free" classification than in response to an "echo full" classification (e.g., the updating occurs once per input signal frame in the second case, and once per each "x" frames in the first case, where "x" is a number greater than one).

In some embodiments, the inventive system is an endpoint (or server) of a teleconferencing system. For example, such an endpoint is a telephone system (e.g., a telephone). In some implementations, the link (e.g., link 2 of FIG. 1) between such endpoints and/or server is link (or access network) of the type employed by a conventional Voice over Internet Protocol (VOIP) system, data network, or telephone network (e.g., any conventional telephone network) to implement data transfer between telephone systems. In typical use of the system, users of at least two of the endpoints are participating in a telephone conference.

Figure 2:
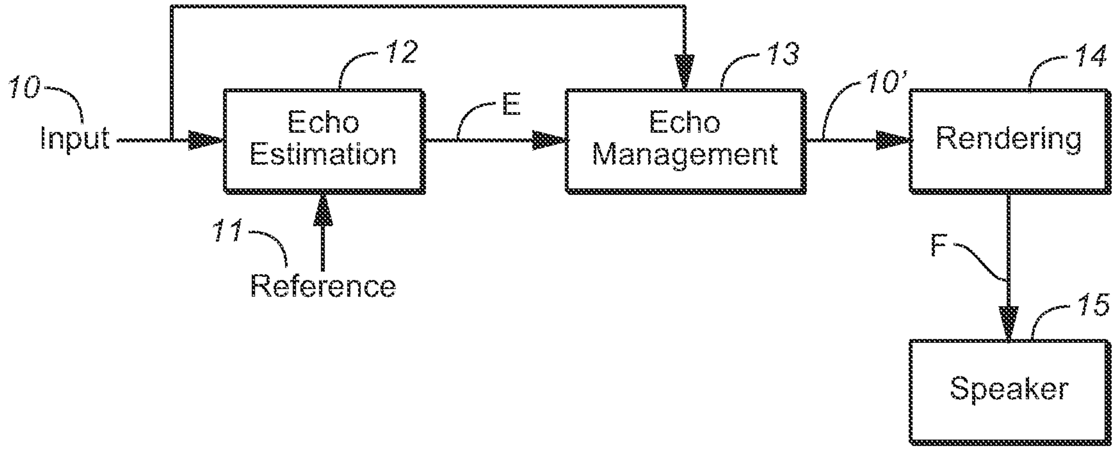
FIG. 2 is a block diagram of another embodiment of the inventive system.

FIG. 2 is a block diagram of another embodiment of the inventive system. The FIG. 2 system includes echo estimation system 12, which is coupled and configured to perform echo estimation on input signal 10 in accordance with any embodiment of the inventive method using reference signal 11, to generate an estimate E of the echo content of input signal 10. For example, system 12 can be implemented as the subsystem of system 1 (of FIG. 1) which comprises elements 6, 200, 202, 203, 206, 300, 301, 303, 304, and 400, with reference signal 11 corresponding to reference signal 100 of FIG. 1, input signal 10 corresponding to input signal 103 of FIG. 1, and echo estimate E corresponding to the output 402 of subsystem 400 of FIG. 1.

The FIG. 2 system can also include echo management system 13 which is coupled and configured to perform echo management (e.g., echo cancellation or suppression) on input signal 10 in accordance with any embodiment of the inventive method using echo content estimate E, to generate an echo-managed (e.g., echo-cancelled or echo-suppressed) version (signal 10') of input signal 10. For example, system 13 can be implemented as subsystems 403 and 206 of system 1 (of FIG. 1), with echo-managed signal 10' corresponding to output signal 207 of FIG. 1, input signal 10 corresponding to frequency-domain representation 204A and 204B of input signal 103 of FIG. 1, and echo estimate E corresponding to the output 402 of subsystem 400 of FIG. 1.

The FIG. 2 system also includes rendering system 14 which is coupled and configured to render echo-managed signal 10' (e.g., in a conventional manner) to generate speaker feed F, and speaker 15 which is coupled and configured to emit sound in response to speaker feed F. The sound is perceived by a user as an echo-managed version of the audio content of input signal 10.

Embodiments of the invention can be used to improve echo control (or management) in ES and echo cancellers; and to improve reporting of echo in in-service monitoring. For example, the estimated echo delay (e.g., the output of subsystem 302 of system 1, or another signal indicative of echo delay estimated by system 1) and the estimated echo loss (e.g., the ELN values output from subsystem 303 of system 1, or another signal indicative of echo loss estimated by system 1), or another estimate of echo content of an input audio signal generated in accordance with any embodiment of the invention, can also be used (e.g., output from system 1, or from another embodiment of the inventive echo estimation or echo management system) for improving the reporting of echo, for example, in quality of service (QoS) monitoring.

In one class of embodiments, the invention is a method for performing echo estimation or echo management on an input audio signal, said method including steps of:

(a) determining an M-bin, frequency domain representation of the input audio signal (e.g., in subsystem 203 of system 1), and a sparse prediction filter set consisting of N prediction filters, where each of the N prediction filters corresponds to a different bin of an N-bin subset of the M-bin frequency domain representation, where N and M are positive integers and N is less than M (preferably, N is much less than M); and (b) performing echo estimation on the input audio signal, including by adapting the N prediction filters (e.g., in subsystem 301 of system 1) to generate a set of N adapted prediction filter impulse responses, and generating an estimate of echo content of the input audio signal including by processing the N adapted prediction filter impulse responses.

For example the method also includes a step of:

(c) performing echo management on the input audio signal using the estimate of echo content (e.g., in subsystems 403 and 206 of system 1, or system 13 of FIG. 2) thereby generating an echo-managed (e.g., echo-suppressed) audio signal. Optionally, the method also includes one or both of the steps of rendering the echo-managed audio signal (e.g., in system 14 of FIG. 2) to generate at least one speaker feed; and driving at least one speaker (e.g., speaker 15 of FIG. 2) with the at least one speaker feed to generate a soundfield.

In another class of embodiments, the invention is a method for performing echo estimation or echo management on an input audio signal, said method including steps of:

(a) determining a prediction filter set consisting of N prediction filters, where each of the N prediction filters corresponds to a different bin of a frequency domain representation of the input audio signal, and N is a positive integer; and (b) performing echo estimation on the input audio signal, including by adapting the N prediction filters (e.g., in subsystem 301 of system 1) to generate a set of N adapted prediction filter impulse responses, and generating an estimate of echo content of the input audio signal (e.g., in subsystems 302, 303, 202, 304, and 400 of system 1) including by processing the N adapted prediction filter impulse responses, wherein step (b) includes a step of generating (e.g., in subsystem 302 of system 1) a composite impulse response from the adapted prediction filter impulse responses (e.g., from a statistical function of the adapted prediction filter impulse responses, e.g., by adding or averaging the adapted prediction filter impulse responses), and generating (e.g., in subsystem 302 of system 1) an estimate of transmission delay for echo content of the input audio signal (e.g., a transmission delay estimate for at least one frame of the input audio signal) from the composite impulse response. Optionally, step (b) includes a step of weighting the composite impulse response with a transformed gradient (e.g., a transformed gradient which has been generated in a manner described in this disclosure) to generate a weighted composite impulse response, and generating the estimate of transmission delay from the weighted composite impulse response.

For example, the method also includes a step of:

(c) performing echo management on the input audio signal using the estimate of echo content (e.g., in subsystems 403 and 206 of system 1, or system 13 of FIG. 2) thereby generating an echo-managed (e.g., echo-suppressed) audio signal. Optionally, the method also includes one or both of the steps of rendering the echo-managed audio signal (e.g., in system 14 of FIG. 2) to generate at least one speaker feed; and driving at least one speaker (e.g., speaker 15 of FIG. 2) with the at least one speaker feed to generate a soundfield.

In another class of embodiments, the invention is a method for performing echo estimation or echo management on an input audio signal, said method including steps of:

(a) determining a prediction filter set consisting of N prediction filters, where each of the N prediction filters corresponds to a different bin of a frequency domain representation of the input audio signal, and N is a positive integer; and (b) performing echo estimation on the input audio signal, including by adapting the N prediction filters (e.g., in subsystem 301 of system 1) to generate a set of N adapted prediction filter impulse responses, and generating an estimate of echo content of the input audio signal including by processing the N adapted prediction filter impulse responses, wherein step (b) includes a step of modifying (e.g., in subsystem 302 and/or subsystem 303 of system 1) the adapted prediction filter impulse responses (e.g., by removing therefrom each peak having absolute value greater than a threshold value, and/or removing from each of the adapted prediction filter impulse responses each peak suggesting transmission delay different from a consensus delay estimate, where the consensus delay estimate is determined from the other adapted prediction filter impulse responses), thereby generating modified prediction filter impulse responses, and generating an estimate of transmission delay and/or an estimate of echo loss of the input audio signal (e.g., a transmission delay estimate for at least one frame of the input audio signal) from the modified prediction filter impulse responses.

For example, the method also includes a step of:

(c) performing echo management on the input audio signal using the estimate of echo content (e.g., in subsystems 403 and 206 of system 1, or system 13 of FIG. 2) thereby generating an echo-managed (e.g., echo-suppressed) audio signal. Optionally, the method also includes one or both of the steps of rendering the echo-managed audio signal (e.g., in system 14 of FIG. 2) to generate at least one speaker feed; and driving at least one speaker (e.g., speaker 15 of FIG. 2) with the at least one speaker feed to generate a soundfield.

In another class of embodiments, the invention is a method for performing echo estimation or echo management on an input audio signal, where the input audio signal has an expected maximum transmission delay, said method including steps of:

(a) determining a prediction filter set consisting of N prediction filters, where each of the N prediction filters corresponds to a different bin of a frequency domain representation of the input audio signal, N is a positive integer, and each of the N prediction filters has length greater than L, where L is the expected maximum transmission delay; and (b) performing echo estimation on the input audio signal, including by adapting the N prediction filters (e.g., in subsystem 301 of system 1) to generate a set of N adapted prediction filter impulse responses, truncating (e.g., in subsystem 301 of system 1) each of the adapted prediction filter impulse responses to generate a set of N truncated adapted prediction filter impulse responses, each of the truncated adapted prediction filter impulse responses having length not greater than L, and generating an estimate of echo content of the input audio signal including by processing the N truncated adapted prediction filter impulse responses.

For example, the method also includes a step of:

(c) performing echo management on the input audio signal using the estimate of echo content (e.g., in subsystems 403 and 206 of system 1, or system 13 of FIG. 2) thereby generating an echo-managed (e.g., echo-suppressed) audio signal. Optionally, the method also includes one or both of the steps of rendering the echo-managed audio signal (e.g., in system 14 of FIG. 2) to generate at least one speaker feed; and driving at least one speaker (e.g., speaker 15 of FIG. 2) with the at least one speaker feed to generate a soundfield.

In another class of embodiments, the invention is a method for performing echo estimation or echo management on an input audio signal, said method including steps of:

(a) classifying the input audio signal as being echo free, in the sense of requiring relatively few echo estimation and/or echo management resources, or as not being echo free and thus needing relatively more echo estimation and/or echo management resources; and (b) performing the echo estimation or echo management on the input audio signal, in a manner using echo estimation and/or echo management resources determined at least in part by classification of the input audio signal as being echo free or as not being echo free.

For example, step (b) includes a step of performing echo management on the input audio signal (e.g., in subsystems 403 and 206 of system 1, or system 13 of FIG. 2), thereby generating an echo-managed (e.g., echo-suppressed) audio signal. Optionally, the method also includes one or both of the steps of rendering the echo-managed audio signal (e.g., in system 14 of FIG. 2) to generate at least one speaker feed; and driving at least one speaker (e.g., speaker 15 of FIG. 2) with the at least one speaker feed to generate a soundfield.

Aspects of the invention include a system or device configured (e.g., programmed) to perform any embodiment of the inventive method, and a tangible computer readable medium (e.g., a disc) which stores code for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

Some embodiments of the inventive system (e.g., some implementations of system 1 of FIG. 1) are implemented as a configurable (e.g., programmable) digital signal processor (DSP) that is configured (e.g., programmed and otherwise configured) to perform required processing on audio signal(s), including performance of an embodiment of the inventive method. Alternatively, embodiments of the inventive system (e.g., some implementations of system 1 of FIG. 1) are implemented as a general purpose processor (e.g., a personal computer (PC) or other computer system or microprocessor, which may include an input device and a memory) which is programmed with software or firmware and/or otherwise configured to perform any of a variety of operations including an embodiment of the inventive method. Alternatively, elements of some embodiments of the inventive system are implemented as a general purpose processor or DSP configured (e.g., programmed) to perform an embodiment of the inventive method, and the system also includes other elements (e.g., one or more loudspeakers and/or one or more microphones). A general purpose processor configured to perform an embodiment of the inventive method would typically be coupled to an input device (e.g., a mouse and/or a keyboard), a memory, and a display device.

Another aspect of the invention is a computer readable medium (for example, a disc or other tangible storage medium) which stores code for performing (e.g., coder executable to perform) any embodiment of the inventive method or steps thereof.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

Various aspects of the present invention may be appreciated from the following enumerated example embodiments (EEEs).

EEE 1. A method for performing echo estimation or echo management on an input audio signal, said method including steps of:

(a) determining an M-bin, frequency domain representation of the input audio signal, and a sparse prediction filter set consisting of N prediction filters, where each of the N prediction filters corresponds to a different bin of an N-bin subset of the M-bin frequency domain representation, where N and M are positive integers and N is less than M; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses.

EEE 2. The method of EEE 1, also including a step of:

(c) performing echo management on the input audio signal using the estimate of echo content, thereby generating an echo-managed audio signal.

EEE 3. The method of EEE 2, also including a step of:

rendering the echo-managed audio signal to generate at least one speaker feed.

EEE 4. The method of EEE 3, including a step of:

driving at least one speaker with the at least one speaker feed to generate a soundfield.

EEE 5. The method of EEE 1, wherein M is at least substantially equal to 160, and N is much less than M.

EEE 6. The method of EEE 5, wherein N=4 or N=6.

EEE 7. A method for performing echo estimation or echo management on an input audio signal, said method including steps of:

(a) determining a prediction filter set consisting of N prediction filters, where each of the N prediction filters corresponds to a different bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of generating a composite impulse response from the adapted prediction filter impulse responses (e.g., from a statistical function of the adapted prediction filter impulse responses), and generating an estimate of transmission delay for echo content of the input audio signal from the composite impulse response.

EEE 8. The method of EEE 7, wherein step (b) includes a step of weighting the composite impulse response with a transformed gradient to generate a weighted composite impulse response, and generating the estimate of transmission delay from the weighted composite impulse response.

EEE 9. The method of EEE 7, also including a step of:

(c) performing echo management on the input audio signal using the estimate of echo content thereby generating an echo-managed audio signal.

EEE 10. The method of EEE 9, also including a step of: rendering the echo-managed audio signal to generate at least one speaker feed.

EEE 11. The method of EEE 10, including a step of: driving at least one speaker with the at least one speaker feed to generate a soundfield.

EEE 12. The method of EEE 7, wherein the frequency domain representation of the input audio signal is an M-bin, frequency domain representation of the input audio signal, each of the N prediction filters corresponds to a different bin of an N-bin subset of the M-bin frequency domain representation, M is a positive integer, and N is less than M.

EEE 13. A method for performing echo estimation or echo management on an input audio signal, said method including steps of:

(a) determining a prediction filter set consisting of N prediction filters, where each of the N prediction filters corresponds to a different bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of modifying the adapted prediction filter impulse responses, thereby generating modified prediction filter impulse responses, and generating an estimate of transmission delay and/or an estimate of echo loss of the input audio signal from the modified prediction filter impulse responses.

EEE 14. The method of EEE 13, wherein the step of modifying the adapted prediction filter impulse responses includes removing therefrom each peak having absolute value greater than a threshold value.

EEE 15. The method of EEE 13, wherein the step of modifying the adapted prediction filter impulse responses includes removing from each of the adapted prediction filter impulse responses each peak suggesting transmission delay different from a consensus delay estimate, where the consensus delay estimate is determined from the other adapted prediction filter impulse responses.

EEE 16. The method of EEE 15, also including a step of:

(c) performing echo management on the input audio signal using the estimate of echo content thereby generating an echo-managed audio signal.

EEE 17. The method of EEE 16, also including a step of: rendering the echo-managed audio signal to generate at least one speaker feed.

EEE 18. The method of EEE 17, including a step of: driving at least one speaker with the at least one speaker feed to generate a soundfield.

EEE 19. The method of EEE 13, wherein the frequency domain representation of the input audio signal is an M-bin, frequency domain representation of the input audio signal, each of the N prediction filters corresponds to a different bin of an N-bin subset of the M-bin frequency domain representation, M is a positive integer, and N is less than M.

EEE 20. A method for performing echo estimation or echo management on an input audio signal, where the input audio signal has an expected maximum transmission delay, said method including steps of:

(a) determining a prediction filter set consisting of N prediction filters, where each of the N prediction filters corresponds to a different bin of a frequency domain representation of the input audio signal, N is a positive integer, and each of the N prediction filters has length greater than L, where L is the expected maximum transmission delay; and (b) performing echo estimation on the input audio signal, including by adapting the N prediction filter to generate a set of N adapted prediction filter impulse responses, truncating each of the adapted prediction filter impulse responses to generate a set of N truncated adapted prediction filter impulse responses, each of the truncated adapted prediction filter impulse responses having length not greater than L, and generating an estimate of echo content of the input audio signal including by processing the N truncated adapted prediction filter impulse responses.

EEE 21. The method of EEE 20, also including a step of:

(c) performing echo management on the input audio signal using the estimate of echo content thereby generating an echo-managed audio signal.

EEE 22. The method of EEE 21, also including a step of: rendering the echo-managed audio signal to generate at least one speaker feed.

EEE 23. The method of EEE 22, including a step of: driving at least one speaker with the at least one speaker feed to generate a soundfield.

EEE 24. The method of EEE 20, wherein the frequency domain representation of the input audio signal is an M-bin, frequency domain representation of the input audio signal, each of the N prediction filters corresponds to a different bin of an N-bin subset of the M-bin frequency domain representation, M is a positive integer, and N is less than M.

EEE 25. A method for performing echo estimation or echo management on an input audio signal, said method including steps of:

(a) classifying the input audio signal as being echo free, in the sense of requiring relatively few echo estimation and/or echo management resources, or as not being echo free and thus needing relatively more echo estimation and/or echo management resources; and (b) performing the echo estimation or echo management on the input audio signal, in a manner using estimation and/or echo management resources determined at least in part by classification of the input audio signal as being echo free or as not being echo free.

EEE 26. The method of EEE 25, wherein step (b) includes a step of performing echo management on the input audio signal, thereby generating an echo-managed audio signal.

EEE 27. The method of EEE 26, also including a step of:

rendering the echo-managed audio signal to generate at least one speaker feed.

EEE 28. The method of EEE 27, including a step of:

driving at least one speaker with the at least one speaker feed to generate a soundfield.

EEE 29. The method of EEE 25, wherein step (b) includes steps of:

determining an M-bin, frequency domain representation of the input audio signal, and a sparse prediction filter set consisting of N prediction filters, where each of the N prediction filters corresponds to a different bin of an N-bin subset of the M-bin frequency domain representation, where N and M are positive integers and N is less than M; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses.

EEE 30. A system for performing echo estimation or echo management on an input audio signal, said system including:

a subsystem configured to generate data values indicative of an M-bin, frequency domain representation of the input audio signal; and an echo estimation subsystem, coupled and configured to perform echo estimation on the input audio signal, including by:

adapting N prediction filters of a prediction filter set consisting of said N prediction filters to generate a set of N adapted prediction filter impulse responses, where each of the N prediction filters corresponds to a different bin of an N-bin subset of the M-bin frequency domain representation, where N and M are positive integers and N is less than M; and generating an estimate of echo content of the input audio signal including by processing the N adapted prediction filter impulse responses.

EEE 31. The system of EEE 30, also including:

an echo management subsystem, coupled to the echo estimation subsystem and configured to perform echo management on the input audio signal using the estimate of echo content, thereby generating an echo-managed audio signal.

EEE 32. The system of EEE 31, also including:

a rendering subsystem, coupled and configured to render the echo-managed audio signal to generate at least one speaker feed.

EEE 33. The system of EEE 31, also including:

at least one speaker; and a rendering subsystem, coupled and configured to render the echo-managed audio signal to generate at least one speaker feed, and to drive the at least one speaker with the at least one speaker feed to generate a soundfield.

EEE 34. The system of EEE 30, wherein said system is a teleconferencing system endpoint.

EEE 35. The system of EEE 30, wherein said system is a teleconferencing system server.

EEE 36. A system for performing echo estimation or echo management on an input audio signal, said system including:

a subsystem configured to generate data values indicative of an N-bin, frequency domain representation of the input audio signal; and an echo estimation subsystem, coupled and configured to perform echo estimation on the input audio signal, including by:

adapting N prediction filters of a prediction filter set consisting of said N prediction filters to generate a set of N adapted prediction filter impulse responses, where each of the N prediction filters corresponds to a different bin of the N-bin frequency domain representation of the input audio signal, and N is a positive integer; and generating an estimate of echo content of the input audio signal including by processing the N adapted prediction filter impulse responses, wherein said processing includes steps of:

generating a composite impulse response from the adapted prediction filter impulse responses (e.g., from a statistical function of the adapted prediction filter impulse responses), and generating an estimate of transmission delay for echo content of the input audio signal from the composite impulse response.

EEE 37. The system of EEE 36, also including:

an echo management subsystem, coupled to the echo estimation subsystem and configured to perform echo management on the input audio signal using the estimate of echo content, thereby generating an echo-managed audio signal.

EEE 38. The system of EEE 37, also including:

a rendering subsystem, coupled and configured to render the echo-managed audio signal to generate at least one speaker feed.

EEE 39. The system of EEE 37, also including:

at least one speaker; and a rendering subsystem, coupled and configured to render the echo-managed audio signal to generate at least one speaker feed, and to drive the at least one speaker with the at least one speaker feed to generate a soundfield.

EEE 40. The system of EEE 36, wherein said system is a teleconferencing system endpoint.

EEE 41. The system of EEE 36, wherein said system is a teleconferencing system server.

EEE 42. A system for performing echo estimation or echo management on an input audio signal, said system including:

a subsystem configured to generate data values indicative of an N-bin, frequency domain representation of the input audio signal; and an echo estimation subsystem, coupled and configured to perform echo estimation on the input audio signal, including by:

adapting N prediction filters of a prediction filter set consisting of said N prediction filters to generate a set of N adapted prediction filter impulse responses, where each of the N prediction filters corresponds to a different bin of the N-bin frequency domain representation of the input audio signal, and N is a positive integer; and generating an estimate of echo content of the input audio signal including by processing the N adapted prediction filter impulse responses, wherein said processing includes steps of:

modifying the adapted prediction filter impulse responses, thereby generating modified prediction filter impulse responses, and generating an estimate of transmission delay and/or an estimate of echo loss of the input audio signal from the modified prediction filter impulse responses.

EEE 43. The system of EEE 42, wherein the step of modifying the adapted prediction filter impulse responses includes removing therefrom each peak having absolute value greater than a threshold value.

EEE 44. The system of EEE 42, wherein the step of modifying the adapted prediction filter impulse responses includes removing from each of the adapted prediction filter impulse responses each peak suggesting transmission delay different from a consensus delay estimate, where the consensus delay estimate is determined from the other adapted prediction filter impulse responses.

EEE 45. The system of EEE 42, also including:

an echo management subsystem, coupled to the echo estimation subsystem and configured to perform echo management on the input audio signal using the estimate of echo content, thereby generating an echo-managed audio signal.

EEE 46. The system of EEE 45, also including:

a rendering subsystem, coupled and configured to render the echo-managed audio signal to generate at least one speaker feed.

EEE 47. The system of EEE 45, also including:

at least one speaker; and a rendering subsystem, coupled and configured to render the echo-managed audio signal to generate at least one speaker feed, and to drive the at least one speaker with the at least one speaker feed to generate a soundfield.

EEE 48. The system of EEE 42, wherein said system is a teleconferencing system endpoint.

EEE 49. The system of EEE 42, wherein said system is a teleconferencing system server.

EEE 50. A system for performing echo estimation or echo management on an input audio signal, where the input audio signal has an expected maximum transmission delay, said system including:

a subsystem configured to generate data values indicative of a frequency domain representation of the input audio signal; and an echo estimation subsystem, coupled and configured to perform echo estimation on the input audio signal, including by:

adapting N prediction filters of a prediction filter set consisting of said N prediction filters to generate a set of N adapted prediction filter impulse responses, where each of the N prediction filters corresponds to a different bin of the frequency domain representation of the input audio signal, N is a positive integer, and each of the N prediction filters has length greater than L, where L is the expected maximum transmission delay;

truncating each of the adapted prediction filter impulse responses to generate a set of N truncated adapted prediction filter impulse responses, each of the truncated adapted prediction filter impulse responses having length not greater than L; and generating an estimate of echo content of the input audio signal including by processing the N truncated adapted prediction filter impulse responses.

EEE 51. The system of EEE 50, also including:

an echo management subsystem, coupled to the echo estimation subsystem and configured to perform echo management on the input audio signal using the estimate of echo content, thereby generating an echo-managed audio signal.

EEE 52. The system of EEE 51, also including:

a rendering subsystem, coupled and configured to render the echo-managed audio signal to generate at least one speaker feed.

EEE 53. The system of EEE 51, also including:

at least one speaker; and a rendering subsystem, coupled and configured to render the echo-managed audio signal to generate at least one speaker feed, and to drive the at least one speaker with the at least one speaker feed to generate a soundfield.

EEE 54. The system of EEE 50, wherein said system is a teleconferencing system endpoint.

EEE 55. The system of EEE 50, wherein said system is a teleconferencing system server.

It is claimed:

1. A method for performing echo estimation or echo management on an input audio signal, said method including steps of:

(a) determining a prediction filter set consisting of N prediction filters, where each of the N prediction filters is used to process audio data values in a respective bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of modifying the adapted prediction filter impulse responses, thereby generating modified prediction filter impulse responses, and generating an estimate of transmission delay and/or an estimate of echo loss of the input audio signal from the modified prediction filter impulse responses, wherein the step of modifying the adapted prediction filter impulse responses includes either removing therefrom each peak having absolute value greater than a threshold value, or removing from each of the adapted prediction filter impulse responses each peak suggesting transmission delay different from a consensus delay estimate, where the consensus delay estimate is determined from the other adapted prediction filter impulse responses.

2. The method of claim 1, also including a step of:

(c) performing echo management on the input audio signal using the estimate of echo content thereby generating an echo-managed audio signal.

3. The method of claim 2, also including a step of:

rendering the echo-managed audio signal to generate at least one speaker feed.

4. The method of claim 3, including a step of:

driving at least one speaker with the at least one speaker feed to generate a soundfield.

5. A non-transitory computer-readable medium storing instructions that, upon execution by one or more processors, cause the one or more processors to perform the method of claim 1.

6. A method for performing echo estimation or echo management on an input audio signal, said method including steps of:

(a) determining a prediction filter set consisting of N prediction filters, where each of the N prediction filters is used to process audio data values in a respective bin of a frequency domain representation of the input audio signal, and N is a positive integer; and (b) performing echo estimation on the input audio signal, including by adapting the N prediction filters to generate a set of N adapted prediction filter impulse responses, and generating an estimate of echo content of the input audio signal including by processing the N adapted prediction filter impulse responses, wherein step (b) includes a step of modifying the adapted prediction filter impulse responses, thereby generating modified prediction filter impulse responses, and generating an estimate of transmission delay and/or an estimate of echo loss of the input audio signal from the modified prediction filter impulse responses, wherein the frequency domain representation of the input audio signal is an M-bin, frequency domain representation of the input audio signal, each of the N prediction filters corresponds to a different bin of an N-bin subset of the M-bin frequency domain representation, M is a positive integer, and N is less than M.

7. A non-transitory computer-readable medium storing instructions that, upon execution by one or more processors, cause the one or more processors to perform the method of claim 6.

8. A system for performing echo estimation or echo management on an input audio signal, said system including:

a subsystem configured to generate data values indicative of an N-bin, frequency domain representation of the input audio signal; and an echo estimation subsystem, coupled and configured to perform echo estimation on the input audio signal, including by:

adapting N prediction filters of a prediction filter set consisting of said N prediction filters to generate a set of N adapted prediction filter impulse responses, where each of the N prediction filters is used to process audio data values in a respective bin of the N-bin frequency domain representation of the input audio signal, and N is a positive integer; and generating an estimate of echo content of the input audio signal including by processing the N adapted prediction filter impulse responses, wherein said processing includes steps of:

modifying the adapted prediction filter impulse responses, thereby generating modified prediction filter impulse responses, wherein modifying the adapted prediction filter impulse responses includes either removing therefrom each peak having absolute value greater than a threshold value, or removing from each of the adapted prediction filter impulse responses each peak suggesting transmission delay different from a consensus delay estimate, where the consensus delay estimate is determined from the other adapted prediction filter impulse responses; and generating an estimate of transmission delay and/or an estimate of echo loss of the input audio signal from the modified prediction filter impulse responses.

9. The system of claim 8, also including:

an echo management subsystem, coupled to the echo estimation subsystem and configured to perform echo management on the input audio signal using the estimate of echo content, thereby generating an echo-managed audio signal.

10. The system of claim 9, also including:

a rendering subsystem, coupled and configured to render the echo-managed audio signal to generate at least one speaker feed.

11. The system of claim 9, also including:

at least one speaker; and a rendering subsystem, coupled and configured to render the echo-managed audio signal to generate at least one speaker feed, and to drive the at least one speaker with the at least one speaker feed to generate a soundfield.

12. The system of claim 8, wherein said system is a teleconferencing system endpoint.

13. The system of claim 8, wherein said system is a teleconferencing system server.

* * * * *